United States Patent [19]
Kuusio et al.

[11] Patent Number: 5,707,490
[45] Date of Patent: *Jan. 13, 1998

[54] METHOD OF RECOVERING ENERGY FROM WASTE LIQUORS FROM PULP PROCESSES

[75] Inventors: Marjo Kuusio; Samuli Nikkanen, both of Varkaus, Finland

[73] Assignee: Ahlstrom Machinery Oy, Helsinki, Finland

[ * ] Notice: The term of this patent shall not extend beyond the expiration date of Pat. No. 5,509,997.

[21] Appl. No.: 634,268

[22] Filed: Apr. 18, 1996

Related U.S. Application Data

[62] Division of Ser. No. 240,776, filed as PCT/FI92/00315, Nov. 25, 1992, published as WO93/11297, Jun. 10, 1993, Pat. No. 5,509,997.

[51] Int. Cl.$^6$ ................................................. D21C 11/12
[52] U.S. Cl. .......................... 162/16; 162/31; 110/238
[58] Field of Search ........................ 162/16, 30.1, 31; 48/209, 111, 197 R; 110/238; 122/460

[56] References Cited

U.S. PATENT DOCUMENTS

| | | | |
|---|---|---|---|
| 2,606,103 | 8/1952 | Hamm | 23/262 |
| 2,840,454 | 6/1958 | Tomlinson et al. | 162/30.11 |
| 4,135,968 | 1/1979 | Dehaas | 162/30 R |
| 4,953,607 | 9/1990 | Erkki et al. | 159/13.3 |
| 5,201,172 | 4/1993 | Hakulin et al. | 60/39.05 |

*Primary Examiner*—Donald E. Czaja
*Assistant Examiner*—Dean T. Nguyen
*Attorney, Agent, or Firm*—Nixon & Vanderhye P.C.

[57] ABSTRACT

A method of recovering energy from waste liquors from cellulose pulp processes produces high quality superheated steam, a savings in material costs is achieved, and the utilization factor of the pulp mill is improved (that is the number of shutdowns for service is reduced). A main stream of waste liquor from cellulose pulp processing is divided into first and second streams. The first stream is combusted in the recovery boiler to produce steam and the steam is fed to a superheating boiler. The second stream of waste liquor is gasified outside the recovery boiler to produce a combustible gas and an inorganic fraction. The inorganic fraction is not fed to the recovery boiler, but is separately recovered. The combustible gas is burned in the superheating boiler to superheat steam produced from combusting the first stream of waste liquor, the combustible gas providing substantially the only source of fuel for superheating the steam in the superheating boiler.

18 Claims, 1 Drawing Sheet

METHOD OF RECOVERING ENERGY FROM WASTE LIQUORS FROM PULP PROCESSES

This is a divisional of application Ser. No. 08/240,776, filed as PCT/FI92/00315 Nov. 25, 1992, published as WO93/11297 Jun. 10, 1993, now U.S. Pat. No. 5,509,997 issued Apr. 23, 1996.

TECHNICAL FIELD

The present invention relates to a method of recovering energy from waste liquors from pulp processes. The invention relates especially to a method wherein waste liquor is burned in a waste liquor recovery boiler, e.g. in a soda recovery boiler, and wherein heat is recovered from the resulting flue gases by producing saturated and/or partially superheated steam in the recovery boiler.

BACKGROUND ART

When combusting waste liquors in pulp processes, the aim is to separate the organic and the inorganic parts of the dry substance of the waste liquor from each other. The heat from the organic part of the dry substance is recovered and the largest possible amount of steam is produced by means of this heat. Pulping chemicals are recovered from the inorganic part of the dry substance in such a form that they can, in subsequent stages of processing, be converted into a suitable form to be reused in the cooking process.

The soda recovery boiler has, until now, proved to be superior for the recovery of heat and chemicals from waste liquors. The waste liquor is sprayed in the form of small drops into the boiler. In the hot combustion chamber water vapor, volatile parts of the dry substance, and eventually gasifiable parts of the dry substance evaporate from the drops. The gases inflame, thereby delivering heat to the heat surfaces disposed in the boiler and are discharged from the upper end of the boiler. The ash from the waste liquor drops, i.e. the inorganic substances of the waste liquor, accumulate on the bottom of the boiler, from which they are removed and through various stages of processing are conveyed back to the cooking process.

The flue gases from the soda recovery boiler contain a great deal of ash, mainly sodium sulfate, a portion of which flows along with the flue gases upwards in the boiler in the form of fine dust or molten drops. The salts contained in the ash melt at a relatively low temperature and become, when melting, easily adhesive and corrosive. The deposits formed by the molten ash cause the risk of clogging of the flue gas channels and, furthermore, cause corrosion and erosion of the heat surfaces of the boiler. The risk of clogging and corrosion increases considerably the number of the shutdowns for inspection and maintenance.

Salt corrodes metal, particularly if the salt is molten or partly molten. A high temperature of the boiler tubes speeds up the formation of deposits and thereby the corrosion of the heat surfaces. Thus, the deposits affect particularly the heat surfaces for the superheated steam. Usually the corrosion of the materials is reduced by controlling the temperature of the superheater surfaces.

In the places of the superheater, in which the temperature tends to rise especially high or in which there is a great deal of liquid-phase chemicals, in other words, where the corrosion and the erosion are a problem, special-alloy steels have to be used. Special-alloy steels are, however, remarkably more expensive than carbon steels or pressure vessel steels, which are commonly used, such as chrome/-molybdenum- alloy steels. Even special-alloy steels have their maximum operating temperatures, above which they behave in the same way as the cheaper pressure vessel steels. This temperature is substantially lower in soda recovery boilers than in, for instance, oil-fired boilers. Further, connecting special-alloy steel by welding to carbon steel requires special circumstances, e.g. shielding gas, superalloyed filler metals and a demanding welding technique.

If the endurance of the superheater can be improved material costs are saved and the utilization rate of the pulp mill is improved due to the reduced need for shutdowns for maintenance.

Today, the principal way of avoiding corrosion is to choose a sufficiently low temperature and pressure for the produced steam, whereby the detrimental effects of the molten salt decrease. This means that the steam cannot be superheated to as high a temperature as desired for the maximal production of electric power in steam turbine plants.

In a steam power plant, the higher the pressure and the temperature of the steam can be raised in the boiler the higher the overall electrical efficiency of the plant is, i.e. the ratio between the net production of electric power and the consumption of process heat. There is a need to raise the overall electrical efficiency of the soda recovery boilers nearer to that of the conventional coal-fired power plants, i.e., the pressure and the temperature of the steam produced by the soda recovery boilers should be raised to as high a level as possible. Today, the overall electrical efficiency of a soda recovery boiler is about 25%. It would be more advantageous to produce as much electricity by steam as possible because the possible overproduction of steam is more easy to utilize in the form of electricity.

In other industrial boilers, a conventional steam pressure/temperature is e.g. 130 bar/535° C. In soda recovery boilers, the pressure and the temperature have to be regulated in accordance with the strength of the available pressure vessel steels. In the superheater of the soda recovery boilers, ferritic heat resistant steels and austenitic steels reach a longer working life in the hottest part only when the surface temperature of the tubes does not exceed 550°–600° C. The temperature of the superheated steam in the soda recovery boilers is therefore usually not allowed to rise to 500° C. At a pressure of 60–90 bar, a temperature of 450°–480° C. is usually considered to be the maximum temperature.

Attempts have been made to reach higher temperatures in the superheating sections of soda recovery boilers than mentioned above, for example by controlling the combustion process in the boiler. The incoming secondary and tertiary air of the boiler have been controlled in order to achieve as even a combustion process as possible, in which no great temperature variations in the flue gas flow occur. The purpose has been in this way to eliminate sudden and, as regards corrosion, dangerously high temperature peaks in the superheater section, in which case it would be possible to increase the mean temperature in the superheater section. In this way, an increase of a few degrees can possibly be achieved in the superheater section temperature.

Attempts have also been made to achieve higher steam temperatures without the risk of corrosion by reducing the fouling of the superheater surfaces. It is possible to some extent, for instance by appropriate feeding of the air, to reduce the amount of molten, inorganic material carried by the flue gas flow upwards to the superheater section to foul the surfaces of the superheater. On the other hand, the formation of deposits can also be reduced by continuous sweeping.

Attempts have also been made to reduce the fouling of the surfaces and the clogging of the flue gas channels by dimensioning the convection section sufficiently large and increasing the distance between the superheater surfaces. Larger clearances facilitate the sweeping and cleaning of the surfaces. These arrangements increase, however, the size of the boiler and are thus, as regards the building costs, unfavourable.

A soda recovery boiler in which the size of the superheater has had to be increased is, as regards the heat transfer and evaporation efficiency, inferior to a corresponding coal-fired boiler. The tendency of the superheater surfaces to foul multiplies the number of heat surfaces needed in comparison with a boiler, the flue gases of which contain only small amounts of ash or no ash at all.

The suggested improvements mentioned above have not proved to guarantee a continuous production of steam having a temperature of above 500° C. The corrosion of the surfaces of the superheater proceeds, in spite of the alterations, at an uneconomically fast rate. So far, no such method is being used in pulp mills, by means of which steam of the same high quality could be produced in soda recovery boiler plants as in other, conventional power plant boilers.

DISCLOSURE OF THE INVENTION

The object of the present invention is to provide a method which is better than the methods mentioned above for producing high-quality superheated steam in a process for the recovery of chemicals from the pulp cooking.

The object of the invention is in particular to provide a method better than the above mentioned for producing electric energy in a waste liquor burning process.

Thus, the object of the invention is to provide a method by means of which it is possible to significantly reduce the corrosion of the superheaters in a waste liquor burning process, whereby a saving in material costs is achieved, but above all the utilization factor of the pulp mill is improved, i.e., the number of shutdowns for service is reduced.

The above mentioned objects of the invention are realized by a method, characterized in that a portion of the waste liquor to be supplied for combustion in the recovery boiler is separated from the waste liquor flow for separate treatment;

the separated portion of the waste liquor is gasified in a gasifying reactor in order to produce combustion gas;

the combustion gas formed in the gasifying reactor is burned in a superheating boiler, in which the steam produced in the recovery boiler is superheated.

The idea of the invention is to produce saturated or only partly superheated steam in the combustion boiler, itself, for example in a recovery boiler such as soda recovery boiler, and to superheat the steam in a separate superheating boiler by flue gases which do not contain the impurities of the flue gases of the soda recovery boiler.

The use of a separate superheating boiler is prior art. The essential improvement provided by the present invention is that the same fuel which is combusted in the recovery boiler, e.g. black liquor, may be processed by gasifying to provide the fuel for the separate superheating boiler. Substantially no auxiliary fuel, such as mineral oil, natural gas or waste wood, is needed for the separate superheating unless it is desirable for dimensioning or other reasons.

According to the invention, the organic portion of the black liquor is gasified in a gasifying process, either pressurized or under no pressure, the produced gas is purified and the combustible gas is transported to a separate superheating boiler. The gasifying can be carried out with air, oxygen-enriched air or pure oxygen. The heat value of the gas varies usually between 3 and 12 $MJ/m^3n$, depending on the gasification method. The gas produced in a gasification process does not contain, at least not remarkable amounts of, the detrimental inorganic components of the black liquor. The gas is burned like e.g. natural gas. The inorganic material from the gasification process may be used as such or after regeneration as pulp cooking chemical.

The gasification of black liquor may be carried out in many different ways. The generated product gas is purified to a sufficient extent in order to avoid the fouling and corrosion of the separate superheating boiler caused by molten ash and salts typical in the soda recovery boiler. The gasification should aim at as high a heat value of the gas as possible and, further, the purification of gas should preserve the temperature of the gas as high as possible. The most essential aim of the purification of the gas is to remove as much alkali from the gas as possible.

The waste liquor from a pulp cooking process is concentrated by evaporation prior to the gasification of combustion, preferably to a dry solids content of over 65%, most preferably 75–80%, before it is gasified or burned. According to the latest technique available, it is possible to concentrate the waste liquor up to a dry solids content of 85%, in which case it is a relatively good fuel. The viscosity of the black liquor has until now imposed a limit to the concentration. By means of a new pressure heating process it is possible to reduce the viscosity of the black liquor and the evaporation can be carried out up to a very high dry solids content, facilitating thus the burning of the black liquor in a recovery boiler and the gasification in a gasifier. The pressure heating and the subsequent high dry solids evaporation improve the energy economy of both the soda recovery boiler and the liquor gasifier.

The main essential feature of the present invention that the waste liquor from the evaporation is divided in two portions one portion of which is conveyed to a gasifying reactor and the other to a combustion boiler. According to a preferred embodiment of the invention, approximately 10–35% of the waste liquor is conveyed to the gasifier.

The main portion, i.e. 65–90% of the waste liquor is conveyed straight to the waste liquor recovery boiler.

In the recovery boiler, saturated or partially superheated steam, for instance steam of <350° C., can be produced, which is finally superheated in the superheating boiler for example to a steam of >100 bar and >520° C. The superheating boiler can, if so desired, be pressurized, in which case the space required for it is significantly smaller than that of a conventional boiler.

The gas from the gasifier is burned in a separate superheating boiler, in which case the design and the materials of the superheater can be chosen as in any oil-fired boiler without having to consider the harmful effects of the inorganic, molten salts, i.e.:

the superheating surfaces can be placed much closer to each other than in a soda recovery boiler, because they do not foul to the same extent as in the soda recovery boiler;

very little or no cleaning at all of the superheating surfaces is needed, because the superheating is effected by substantially clean flue gases;

the materials for the superheating and other surfaces can be chosen merely on the basis of their heat strength, without having to consider the corrosion risk;

if it seems desirable from an economical point of view, gas produced from the waste liquor and a conventional fuel such as natural gas can easily be burned at the same time in the separate superheating boiler.

According to the present invention, the soda recovery boiler or a corresponding waste liquor recovery boiler is used for burning the major portion of the waste liquor or black liquor stream and for recovering chemicals. The soda recovery boiler functions, however, according to the invention principally as a vaporizing boiler, in which only a partial superheating of the steam is effected at the most. In the vaporizing boiler, the surface temperature of the materials does not rise as high as in the superheating section; therefore there is no the risk of corrosion. The superheater possibly disposed in the soda recovery boiler will be small compared with a conventional boiler, as the main part of the superheating is effected in a separate boiler with purified flue gases and in a considerably hotter environment. The heat surfaces of the superheating boiler are more efficiently used than in a conventional soda recovery boiler, which means that a smaller amount of tubes are needed in a smaller boiler, in other words a saving of capital costs is achieved. Further, the need of sweeping reduces significantly. Usually about 2.5% of the total amount of vapour produced has been used for sweeping. This amount can be reduced to about 1.5%.

The flue gases from the separate superheating boiler can be conducted into the flue gases of the soda recovery boiler at some suitable point, in the upper or the lower part of the soda recovery boiler,. in which case their heat content is recovered more efficiently. In the method of the present invention, the remaining heat of the flue gases of the superheating boiler can be recovered for instance in the preheating of air as in conventional power plant boilers. In a conventional soda recovery boiler, the flue gases are too impure to be conducted to the air preheater. By using flue gases for the preheating of air, back-pressure and bled steam can be saved for other purposes.

Depending on the required steam and power of the mill, the superheating can be adjusted to some extent, but the steam turbines have an optimum operation point, from which it is not advisable to deviate too much.

The pressure and the temperature of the separate superheating boiler can be chosen relatively freely so as to suit the steam system of the mill. There is then no need to build separate pipe systems for many different pressures. The same turbine is available for the steam of the whole mill.

The separate superheating boiler and the waste liquor recovery boiler can be built in such a way that their pressure frames are closely connected to each other, for instance by some kind of a precombustion chamber construction.

By means of the invention, the following additional advantages can be achieved:

by increasing the pressure and the operating temperature of the steam recovered from the waste liquor recovery process by means of the superheating boiler, the overall electrical efficiency of the plant is improved, i.e. more power is generated by the heat recovered in the steam;

the heat surfaces of the separate superheater boiler are more efficiently used than in a conventional soda recovery boiler whereby there are less tubes in a smaller boiler which results in savings in investment costs;

the design of the recovery boiler will be simpler, since the superheater can be omitted from the upper part of the combustion chamber and the boiler can for that reason be built in the shape of a tower, in which the height of the economizer determines the height of the boiler;

special-alloy steels are either not needed at all with clean flue gases or at least they are required less extensively than in conventional soda recovery boilers, even when operating at higher temperatures; if very high temperatures are desired special material may be used but the amount required is significantly smaller than the one presently required;

when burning the gas, substantially no detrimental, melting salt compounds are formed, and for that reason there is no corrosion, even if the boiler is operated at a considerably higher temperature level than at present;

the gas can be used as starting fuel in the waste liquor recovery boiler, in which case no purchased fuel is needed.

By treating a portion of the waste liquor in a gasifier the capacity of the pulp mill is improved.

The invention provides an advantageous alternative particularly when modernizing a boiler plant. By altering the design of the boiler according to the invention the pressure level of an existing soda recovery boiler plant can be raised to the pressure level of the high-pressure steam the rest of the mill.

Further, in a plant according to the invention, a increase of 20–40% in the regeneration of liquor is easily reached. The regeneration capacity of liquor increase in the plant because a portion of the liquor is regenerated in the gasifier outside the soda recovery boiler.

BRIEF DESCRIPTION OF THE DRAWING

The invention will now be described more in detail with reference to the accompanying drawing, in which one embodiment of the process for recovering energy from waste liquor according to the invention is illustrated schematically in FIG. 1.

BEST MODE FOR CARRYING OUT THE INVENTION

Figure 1:
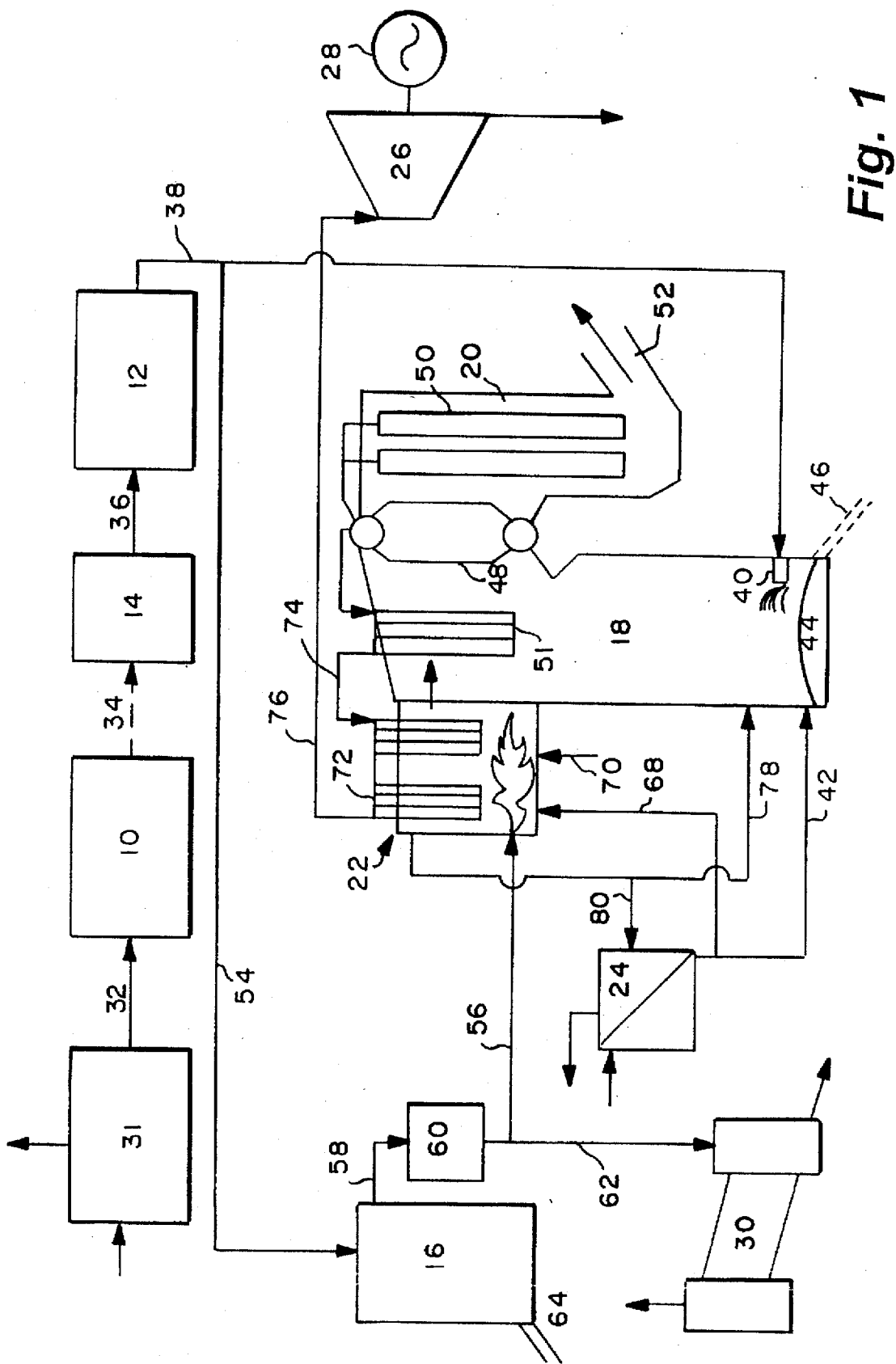

The unit for recovery of energy from waste liquor shown in FIG. 1 comprises evaporator sections 10 and 12, a pressure heating unit 14, a gasifier 16, a waste liquor recovery boiler 18, a heat recovery section 20 connected to it, a separate superheating boiler 22, an air preheater 24, a steam turbine 26, a generator 28 and a lime miud reburing kiln 30.

In the method according to the invention, the pulp coming from the digester house is transferred to the washing department 31, in which the pulp is cleaned and separated from the waste liquor. The waste liquor from the washing, which usually contains about 15–20% dry matter, is led through a line 32 to the first evaporator section 10, in which the waste liquor is concentrated to a dry solids content of about 45%. From the first evaporator section the waste liquor is led to the pressure heating unit 14 through a line 34.

The pressure heating process or the thermal treatment of the waste liquor can be arranged to take place between some of the evaporation stages or immediately before the burning. In the pressure heating, the temperature of the waste liquor is raised to a temperature higher than the cooking temperature, preferably to 170°–200° C., in order to split its macromolecular lignine fractions. The heating can be effected by any economically suitable method: direct or indirect steam heating, or some other heating, such as electrical heating. As the source of heat for the pressure heating, for instance bled steam from a steam turbine plant can be used. The viscosity of the waste liquor can be reduced by means of the pressure heating process, thereby improving its treatment and evaporation properties and facilitating transfer of the waste liquor from one phase to another. Due to the pressure heating, the evaporation can be carried out up to a very high dry solids content which improves the effective calorific value of the waste liquor and the overall efficiency of the electricity production of gas turbine power plant.

From the pressure heating, the waste liquor is led through a line 36 to the evaporator section 12, in which the waste liquor is finally evaporated to a dry solids content of about 80%. From the final evaporation, the waste liquor is led through a line 38 to be sprayed by nozzles 40 into the recovery boiler 18.

Combustion air is supplied to the recovery boiler through a line 42 from the air preheater 24. Through the char bed 44 accumulated on the bottom of the recovery boiler, the molten, inorganic matter flows through an outlet 46 to a dissolving vat, not shown in the figure.

In the recovery boiler 18 and the heat recovery section 20, heat is recovered by means of vaporizing surfaces 48 and water preheaters 50. The flue gases are discharged from the boiler through a line 52. The steam can, if desired, be partially heated in the recovery boiler by means of superheating surfaces 51.

Pre-evaporated, pressure heated and finally evaporated waste liquor is supplied through a line 54 to the gasification stage 16 according to the invention. The gas generated in the gasification stage is led through lines 58 and 56 to the superheating boiler 22, and the residual, inorganic fraction remaining in the gasifier is led through a line 64 to regeneration of chemicals which will not be described here closer. A portion of the gases is led through a line 62 to a lime mud reburning kiln 30. The gases from the gasifier are conveyed, preferably through a purification unit 60, to the superheating boiler or the lime mud reburning kiln whereby the purification unit removes from the gases the components which are detrimental in the subsequent processes. If desired, a portion of the gas from the gasifier can be used as auxiliary fuel in an auxiliary boiler such as bark boiler.

Combustion air is supplied to the superheating boiler through a line 68 from the air preheater and possibly also auxiliary fuel through a line 70. Superheating surfaces 72 are disposed in the superheating boiler for the super-heating of the steam coming from the recovery boiler through steam pipes 74. The superheated steam is led through a line 76 to the steam turbine plant, in which electric power is generated by the turbine 26 and the generator 28.

The flue gases are passed from the superheating boiler directly to the upper part of the recovery boiler or through a line 78 to the lower part of the recovery boiler. A portion of the flue gases are passed through a line 80 to the air preheater 24.

One of the principal starting points of the invention is that an appropriate amount of waste liquor, such as black liquor, is gasified to combustible gas and regeneratable chemicals. By an appropriate amount is meant an amount of fuel by which the desired separate superheating can be accomplished.

As the flue gases in the separate superheating are clean they can be used also for heating the combustion air of the boilers in the air preheaters. Thereby back-pressure and bled steam can be saved.

The pure flue gases from the separate superheating boiler can be circulated as such to the lower section of the furnace to enhance the burning process.

The economical profit from the method according to the invention results especially from the big electric power portion in comparison with the steam portion which can be achieved by it. In present-day integrated paper and pulp mills, the steam demand has decreased. Therefore, it is not any more profitable to recover the energy received from the burning of waste liquor in the form of surplus steam of inferior quality but the energy should be recovered in the form of electric power. By means of the system according to the invention, the electric power yield achieved in the paper and pulp mills is significantly higher than in the system used at present.

EXAMPLE

In the examples below are compared the steam values, the net electric power, steam volumes and the overall electrical efficiency of a conventional soda recovery boiler and two soda recovery boiler—superheating boiler combinations according to the invention, operating in a pulp mill, in which the black liquor flow is 18.5 kgDS/s the bled steam (12 bar) demand is 15.4 kg/s and the low pressure steam (4,5 bar) demand is 49.6 kg/s Example case I The plant comprises a conventional soda recovery boiler which together with a bark-fired boiler produces high pressure steam for turbines, from which bled steam and low pressure steam is further obtained for a sulphate pulp process. In addition to the high pressure and bleeder turbine, electric power is also generated by a condensing turbine.

77.2 kg/s of high pressure steam (480° C., 85 bar) is produced. The high pressure steam is allowed to expand in the high pressures turbine to 12 bar. A portion of this bleeder steam is used in the mill. The bleeder steam demand in the pulp mill is 15.4 kg/s and 6.7 kg/s of it returns in the form of condensate. The remaining portion of the bleeder steam is allowed to expand in a back-pressure turbine to 4.5 bar. Most of the low pressure steam is supplied to the mill to be used as process steam and the remaining portion passes through a condensing turbine, expanding to 0.06 bar. The condensate returns from the mill at a temperature of 120° C. The low pressure steam demand of the pulp mill is 49.6 kg/s of which 40.7 kg/s returns in the form of condensate.

The combined mechanical electric power received from the high pressure, bleeder and condensing turbines is 46.0 MW; if losses are considered, 42.2 MW. Calculated on the bleeder steam volume and the low pressure steam volume, the process heat of the pulp mill is 157.7 MW. The overall electrical efficiency of the plant is 42.2/157.7=0.238.

Example case II

The plant comprises a soda recovery boiler and a super heating boiler which burns gas obtained from a gasifying reactor. The superheating of the high pressure steam is effected in the superheating boiler, only. A bark-fired boiler additionally produces high pressure steam. The turbine plant does not include a condensing turbine. The energy demand of the lime sludge reburning kiln is met by the gas obtained from the gasifying reactor and by purchased fuel.

61.9 kg/s of steam (311° C., 100 bar) is produced in a soda recovery boiler which steam is superheated in a superheating boiler to high pressure steam (540° C., 100 bar). The bark-fired boiler produces 5.6 kg/s of high pressures steam. Thus, the plant produces a total of 67.5 kg/s of high pressure steam. The steam volumes required in the pulp plant are the same as in example case I.

12.5 kgDS/s of black liquor is incinerated in a soda recovery boiler, in which no superheating of steam is carried out. 6 kgDS/s of black liquor remains to be transported for gasification. 2.5 m³n/kgDS of product gas with a heat value of 4 MJ/m³n is produced by the gasification.

The energy produced from black liquor transported to the gasification can be calculated from the above estimates; it is 60 MW. The energy demand of the superheating boiler is 49.16 MW. The remaining energy (60–49.16)MV=13.84 MW is used to cover the energy demand of the lime mud reburning kiln. Thus, in the example case II, the purchased fuel demand of the lime mud reburning kiln is reduced to 4.36 MW which is 24% of the original demand.

In this case the combined net power produced by the turbines is 42.4 MW. The process heat is 157.7 MW which is the same as in the preceding example. The overall electrical efficiency is thus 0.269.

Example case III

The plant comprises a soda recovery boiler and a superheating boiler according to the invention which burns the gas from the gasifying reactor. The whole volume of steam from the soda recovery boiler is high pressure superheated in the superheating boiler. Additionally, the bark-fired boiler (auxiliary boiler) produces high pressure steam. The turbine unit includes also a condensing turbine. All the gas produced in the gasifying reactor is combusted in the superheating boiler which increases the volume of high pressures gas received from the soda recovery boiler compared to example case II.

13.5 kgDS/s of black liquor is combusted in a soda recovery boiler and 66.9 kg/s of live steam (311° C., 100 bar> is produced. The energy required for superheating the steam of the soda recovery boiler is 50 MW and the demand is covered by the product gas from the gasifying reactor. Gasification of 5 kgDS/s of black liquor produces gas with an energy content of 50 MW which covers the demand of the superheating boiler. The bark-fired boiler additionally produces 5.6 kg/s of steam. The steam volume produced by the whole plant is 72.5 kg/s and the net power produced by the turbine plant is 7.1 MW. The overall electrical efficiency is thus 47.1 MW/157.7MW=0.298.

When comparing the example cases with each other it can be stated that in the example case II, gas is produced to partly cover also the energy demand of the lime mud reburning kiln. The need to purchase fuel reduces to 24% compared to example case I. Further, no condensing turbine is needed in the plant to produce electricity. The overall electrical efficiency of the plant is slightly improved. Also, the previously mentioned advantages provided by the invention, for example less problems with the corrosion of the superheating surfaces, are achieved.

In the example case III, the net electrical power production of the plant increases from 42.2 MW to 47.1 MW. At the same time the overall electrical efficiency of the plant improves significantly compared to example case I.

TABLE I

Results from the example cases

|  | CASE I | CASE II | CASE III |
| --- | --- | --- | --- |
| NET ELECTRIC POWER | 42.2 MW | 42.4 MW | 47.1 MW |
| STEAM PRODUCED IN SODA RECOVERY BOILER | 480° C./ 85 bar | 311° C./ 100 bar | 311° C./ 100 bar |
| HIGH PRESSURE STEAM VALUES | 480° C./ 85 bar | 540° C./ 100 bar | 540° C./ 100 bar |
| HIGH PRESSURE STEAM QUANTITY | 77.2 kg/s | 67.5 kg/s | 72.5 kg/s |
| OVERALL ELECTRICAL EFFICIENCY | 0.268 | 0.269 | 0.298 |
| PURCHASED FUEL DEMAND OF LIME MUD REBURNING KILN | 18.2 MW | 4.3 W | 18.2 MW |

The invention is not intended to be limited to the embodiment illustrated and described above but it can be modified and varied within the scope and spirit of the invention as defined by the following claims. Thus, both gasification and superheating and even the waste liquor combustion itself can be carried out at a raised pressure whereby the general advantages of a pressurized plant are achieved.

We claim:

1. A method of recovering energy from waste liquors from cellulose pulp processes, utilizing a recovery boiler and a superheating boiler, and comprising the steps of:
   (a) dividing a main stream of waste liquor from cellulose pulp processing into first and second streams;
   (b) combusting the first stream of waste liquor in the recovery boiler to produce steam, and feeding the steam so produced to the superheating boiler;
   (c) gasifying the second stream of waste liquor outside the recovery boiler to produce a combustible gas and an inorganic fraction, the inorganic fraction not fed to the recovery boiler; and
   (d) burning the combustible gas from step (c) in the superheating boiler to superheat the steam from step (b), the combustible gas from step providing substantially the only source of fuel for superheating the steam in the superheating boiler.

2. A method as recited in claim 1 wherein step (a) is practiced to divide the main waste liquor stream to provide about 10–35% thereof in the second stream.

3. A method as recited in claim 2 comprising the further step of acting on at least the liquor that will be provided in the second stream so that it has a dry solids content of greater than 65% prior to the practice of step (c).

4. A method as recited in claim 3 wherein said acting upon step is practiced by pressure heating the main waste liquor stream to a temperature higher than cooking temperature in the cellulose pulp processing to split macromolecular lignin fractions prior to the practice of step (a).

5. A method as recited in claim 2 comprising the further step of acting on at least the liquor that will be provided in the second stream so that it has a dry solids content of between about 75–85% prior to the practice of step (c).

6. A method as recited in claim 5 wherein said acting upon step is practiced by pressure heating the main waste liquor stream to a temperature higher than cooking temperature in the cellulose pulp processing to split macromolecular lignin fractions prior to the practice of step (a).

7. A method as recited in claim 1 comprising the further step of purifying the combustion gas between steps (c) and (d).

8. A method as recited in claim 1 wherein step (b) is practiced to produce steam at a temperature of less than 350° C.

9. A method as recited in claim 1 wherein step (c)is practiced under pressure, and wherein the superheating boiler is held under pressure.

10. A method as recited in claim 1 wherein flue gases are produced in the practice of steps (b) and (d), and comprising the further step of combining the flue gases resulting from the practice of steps (b) and (d).

11. A method as recited in claim 1 wherein step (b) is practiced in part by supplying air to the recovery boiler; and comprising the further step of utilizing flue gases produced during the practice of step (d) to preheat the air which is supplied to the recovery boiler.

12. A method as recited in claim 1 wherein during the practice of step (d) flue gases are produced; and comprising the further step of feeding the flue gases from step (d) to a lower part of the recovery boiler.

13. A method as recited in claim 1 comprising the further steps of, between steps (c) and (d), dividing the combustible gas from step (c) into two streams, feeding one of the streams to the superheating boiler to practice step (d), and feeding the other stream for combustion in at least one of a lime mud reburning kiln and an auxiliary boiler.

14. A method as recited in claim 1 comprising the further step of acting on at least the liquor that will be provided in the second stream so that it has a dry solids content of greater than 65% prior to the practice of step (c).

15. A method as recited in claim 1 comprising the further step of acting on at least the liquor that will be provided in the second stream so that it has a dry solids content of between about 75-85% prior to the practice of step (c).

16. A method as recited in claim 15 wherein said acting upon step is practiced by pressure heating the main waste liquor stream to a temperature higher than cooking temperature in the cellulose pulp processing to split macromolecular lignin fractions prior to the practice of step (a).

17. A method as recited in claim 1 wherein said acting upon step is practiced by pressure heating the main waste liquor stream to a temperature higher than cooking temperature in the cellulose pulp processing to split macromolecular lignin fractions prior to the practice of step (a).

18. A method as recited in claim 1 comprising the further step of, prior to step (a), pressure heating the main waste liquor stream to a temperature of at least 170° to split macromolecular lignin fractions.

* * * * *